US011606588B2

(12) United States Patent
Badam et al.

(10) Patent No.: US 11,606,588 B2
(45) Date of Patent: Mar. 14, 2023

(54) CONTENT-MODIFICATION SYSTEM WITH LOCAL AVAIL CORRECTION FEATURE

(71) Applicant: Roku, Inc., San Jose, CA (US)

(72) Inventors: Sandeep Badam, Fremont, CA (US); Rimi Sahu, Walnut Creek, CA (US); Krzysztof Mokszan, Walnut Creek, CA (US); Raghavendra Sunku, Novato, CA (US); Karthik Hireyemmiganur Rangappa, Walnut Creek, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/513,482

(22) Filed: Oct. 28, 2021

(65) Prior Publication Data

US 2022/0141525 A1 May 5, 2022

Related U.S. Application Data

(60) Provisional application No. 63/109,208, filed on Nov. 3, 2020.

(51) Int. Cl.
*H04N 7/16* (2011.01)
*H04N 21/24* (2011.01)
(Continued)

(52) U.S. Cl.
CPC ....... *H04N 21/2407* (2013.01); *H04N 21/266* (2013.01); *H04N 21/4383* (2013.01);
(Continued)

(58) Field of Classification Search
CPC ............. H04N 21/2407; H04N 21/266; H04N 21/4383; H04N 21/6118; H04N 21/812;
(Continued)

(56) References Cited

U.S. PATENT DOCUMENTS

2002/0085090 A1\* 7/2002 Kamen ................... H04N 21/47
348/61
2010/0088154 A1\* 4/2010 Vailaya .............. G06Q 30/0251
705/7.29
(Continued)

FOREIGN PATENT DOCUMENTS

EP 2899989 A1 7/2015

OTHER PUBLICATIONS

International Searching Authority, International Search Report and Written Opinion dated Feb. 28, 2022, issued in connection with International Patent Application No. PCT/US2021/057333.

*Primary Examiner* — Gigi L Dubasky
(74) *Attorney, Agent, or Firm* — Sterne, Kessler, Goldstein & Fox P.L.L.C.

(57) ABSTRACT

An example method includes detecting over a particular time-period and at a periodic interval, match data indicating whether reference fingerprints representing content transmitted by a non-local content-distribution system on a particular channel matches query fingerprints representing content received by a content-presentation device on the particular channel. The method also includes based on the match data, identifying three time-periods within the particular time-period, the middle of which being a time-period (i) in which there is a threshold consistent lack of matching for a threshold duration and (ii) that corresponds to a detected portion of the received content that serves as a placeholder for local content to be inserted by a local content-distribution system. The method also includes based on the three identified time-periods, detecting, that the local content-distribution system inserted local content into the content received on the particular channel in connection with the detected portion, and responsively performing an action.

20 Claims, 15 Drawing Sheets

(51) Int. Cl.
  *H04N 21/81*      (2011.01)
  *H04N 21/8547*    (2011.01)
  *H04N 21/266*     (2011.01)
  *H04N 21/438*     (2011.01)
  *H04N 21/61*      (2011.01)
  *H04N 21/845*     (2011.01)

(52) U.S. Cl.
  CPC ....... *H04N 21/6118* (2013.01); *H04N 21/812* (2013.01); *H04N 21/8456* (2013.01); *H04N 21/8547* (2013.01)

(58) Field of Classification Search
  CPC ........... H04N 21/8456; H04N 21/8547; H04N 21/222; H04N 21/23424; H04N 21/633
  See application file for complete search history.

(56) References Cited

U.S. PATENT DOCUMENTS

| | | |
|---|---|---|
| 2014/0082648 A1 | 3/2014 | Tanner et al. |
| 2014/0123173 A1 | 5/2014 | Mak et al. |
| 2014/0278749 A1 | 9/2014 | Trenkle et al. |
| 2018/0131986 A1 | 5/2018 | Cole et al. |
| 2018/0198847 A1* | 7/2018 | Lai ............ H04L 67/52 |
| 2020/0389695 A1* | 12/2020 | Grover ............ H04N 21/26258 |
| 2020/0404216 A1* | 12/2020 | Seo ............ H04N 21/43072 |
| 2021/0021893 A1* | 1/2021 | Sunku ............ H04N 21/44016 |
| 2021/0258398 A1* | 8/2021 | Lintz ............ H04L 43/16 |
| 2022/0021940 A1* | 1/2022 | Wang ............ H04N 21/4383 |

* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | | |
|---|---|---|---|---|---|---|
| T9 | | Compare first fingerprint data and second fingerprint data | | | | |
| T10 | | Detect a match between first fingerprint data and second fingerprint data | | | | |
| T11 | | Identify the channel on which the second content is being received | | | | |
| T12 | | Generate metadata associated with the identified channel | | | | |
| T13 | | Transmit an indication of the identified channel and the associated metadata | | | | |
| T14 | | | | | Receive the indication of the identified channel and the associated metadata | |

Figure 4B

| T15 | | | Determine historical content consumption data | |
|---|---|---|---|---|
| T16 | Transmit third content | | | |
| T17 | Generate third fingerprint data and third metadata | | | |
| T18 | Transmit third fingerprint data and third metadata | | | |
| T19 | | | Receive modifiable content segment | |
| T20 | | | Generate fourth fingerprint data and fourth metadata | |
| T21 | | | Transmit fourth fingerprint data and fourth metadata | |
| T22 | | Receive third fingerprint data and third metadata | | |
| T23 | | Receive fourth fingerprint data and fourth metadata | | |

Figure 4C

| | | | |
|---|---|---|---|
| T24 | | Compare at least a portion of third fingerprint data and at least a portion of fourth fingerprint data | |
| T25 | | Detect a match between at least a portion of third fingerprint data and at least a portion of fourth fingerprint data | |
| T26 | | Identify an upcoming content modification opportunity on the identified channel | |
| T27 | | Transmit the third fingerprint data and the third metadata | |
| T28 | Receive third fingerprint data and third metadata | | |
| T29 | Receive fifth content | | |
| T30 | Output for presentation fifth content | | |

Figure 4D

| | | | |
|---|---|---|---|
| T31 | Generate fifth fingerprint data and fifth metadata | | |
| T32 | Compare the third fingerprint data and the fifth fingerprint data | | |
| T33 | Detect a match between the third fingerprint data and the fifth fingerprint data | | |
| T34 | Determine modification start time and modification end time | | |
| T35 | Transmit a request for supplemental content | | |
| T36 | | Receive request and select supplemental content | |
| T37 | | Transmit request for link | |
| T38 | | | Transmit link |

Figure 4E

| T39 | | Transmit link | | | |
|---|---|---|---|---|---|
| T40 | Receive link and retrieve supplemental content | | | | |
| T41 | Perform content modification operation | | | | |

Figure 4F

CONTENT-MODIFICATION SYSTEM WITH LOCAL AVAIL CORRECTION FEATURE

CROSS-REFERENCE TO RELATED APPLICATIONS

This disclosure claims priority to U.S. Provisional Pat. App. No. 63/109,208 filed Nov. 3, 2020, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes determining, by a computing system, over a particular time-period and at a periodic interval, a viewer count defined by an amount of content-presentation devices that are receiving content on a particular channel from a non-local content-distribution system. The method also includes based on the determined viewer count, identifying, by the computing system, within the particular time-period: (i) a first time-period where there is a threshold consistent viewer count for a first threshold duration, (ii) a second time-period following the first time-period where (a) there is a drop in the viewer count by a threshold amount and (b) the drop lasts for a second threshold duration, and (iii) a third time-period following the second time-period where the viewer count returns to an amount that is within a threshold range of the threshold consistent viewer count for a third threshold duration. The method also includes based on the identified first, second, and third time-periods, detecting, by the computing system, within the content, a portion of the content that serves as a placeholder for local content to be inserted by a local content-distribution system. The method also includes performing, by the computing system, an action associated with the detected portion.

In another aspect, a non-transitory computer-readable storage medium has stored thereon program instructions that, upon execution by a processor, cause performance of a set of operations. The set of operations includes determining, over a particular time-period and at a periodic interval, a viewer count defined by an amount of content-presentation devices that are receiving content on a particular channel from a non-local content-distribution system. The set of operations also includes based on the determined viewer count, identifying, within the particular time-period: (i) a first time-period where there is a threshold consistent viewer count for a first threshold duration, (ii) a second time-period following the first time-period where (a) there is a drop in the viewer count by a threshold amount and (b) the drop lasts for a second threshold duration, and (iii) a third time-period following the second time-period where the viewer count returns to an amount that is within a threshold range of the threshold consistent viewer count for a third threshold duration. The set of operations also includes based on the identified first, second, and third time-periods, detecting, within the content, a portion of the content that serves as a placeholder for local content to be inserted by a local content-distribution system. The set of operations also includes performing an action associated with the detected portion.

In another aspect, a computing system includes a processor and a non-transitory computer-readable storage medium, having stored thereon program instructions that, upon execution by the processor, cause performance of a set of operations. The set of operations includes determining, over a particular time-period and at a periodic interval, a viewer count defined by an amount of content-presentation devices that are receiving content on a particular channel from a non-local content-distribution system. The set of operations also includes based on the determined viewer count, identifying, within the particular time-period: (i) a first time-period where there is a threshold consistent viewer count for a first threshold duration, (ii) a second time-period following the first time-period where (a) there is a drop in the viewer count by a threshold amount and (b) the drop lasts for a second threshold duration, and (iii) a third time-period following the second time-period where the viewer count returns to an amount that is within a threshold range of the threshold consistent viewer count for a third threshold duration. The set of operations also includes based on the identified first, second, and third time-periods, detecting, within the content, a portion of the content that serves as a placeholder for local content to be inserted by a local content-distribution system. The set of operations also includes performing an action associated with the detected portion.

In another aspect, a method includes detecting, by a computing system, over a particular time-period and at a periodic interval, match data indicating whether reference fingerprint data representing content transmitted by a non-local content-distribution system on a particular channel matches query fingerprint data representing content received by a content-presentation device on the particular channel. The method also includes based on the detected match data, identifying, by the computing system, within the particular time-period: (i) a first time-period where there is threshold consistent fingerprint data matching occurring for a first threshold duration, (ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and (iii) a third time-period following the second time-period where there is threshold consistent fingerprint data matching occurring for a third threshold duration. The method also includes based on the identified first, second, and third time-periods, detecting, by the computing system, that the local content-distribution system inserted local content into the content received on the particular channel in connection with the detected portion. The method also includes in response to the detected insertion, performing, by the computing system, an action.

In another aspect, a non-transitory computer-readable storage medium has stored thereon program instructions that, upon execution by a processor, cause performance of a set of operations. The set of operations includes detecting, over a particular time-period and at a periodic interval, match data indicating whether reference fingerprint data representing content transmitted by a non-local content-distribution system on a particular channel matches query fingerprint data representing content received by a content-presentation device on the particular channel. The set of operations also includes based on the detected match data, identifying, within the particular time-period: (i) a first time-period where there is threshold consistent fingerprint data matching occurring for a first threshold duration, (ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and (iii) a third time-period following the second time-period where there is threshold consistent fingerprint data matching occurring for a third threshold duration. The set of operations also includes based on the identified first, second, and third time-periods, identifying that the local content-distribution system inserted local content into the content received on the particular channel in connection with the detected portion. The set of operations also includes performing an action based on the detected insertion.

In another aspect, a computing system includes a processor and a non-transitory computer-readable storage medium, having stored thereon program instructions that, upon execution by the processor, cause performance of a set of operations. The set of operations includes detecting, over a particular time-period and at a periodic interval, match data indicating whether reference fingerprint data representing content transmitted by a non-local content-distribution system on a particular channel matches query fingerprint data representing content received by a content-presentation device on the particular channel. The set of operations also includes based on the detected match data, identifying, within the particular time-period: (i) a first time-period where there is threshold consistent fingerprint data matching occurring for a first threshold duration, (ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and (iii) a third time-period following the second time-period where there is threshold consistent fingerprint data matching occurring for a third threshold duration. The set of operations also includes based on the identified first, second, and third time-periods, identifying that the local content-distribution system inserted local content into the content received on the particular channel in connection with the detected portion. The set of operations also includes performing an action based on the detected insertion.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
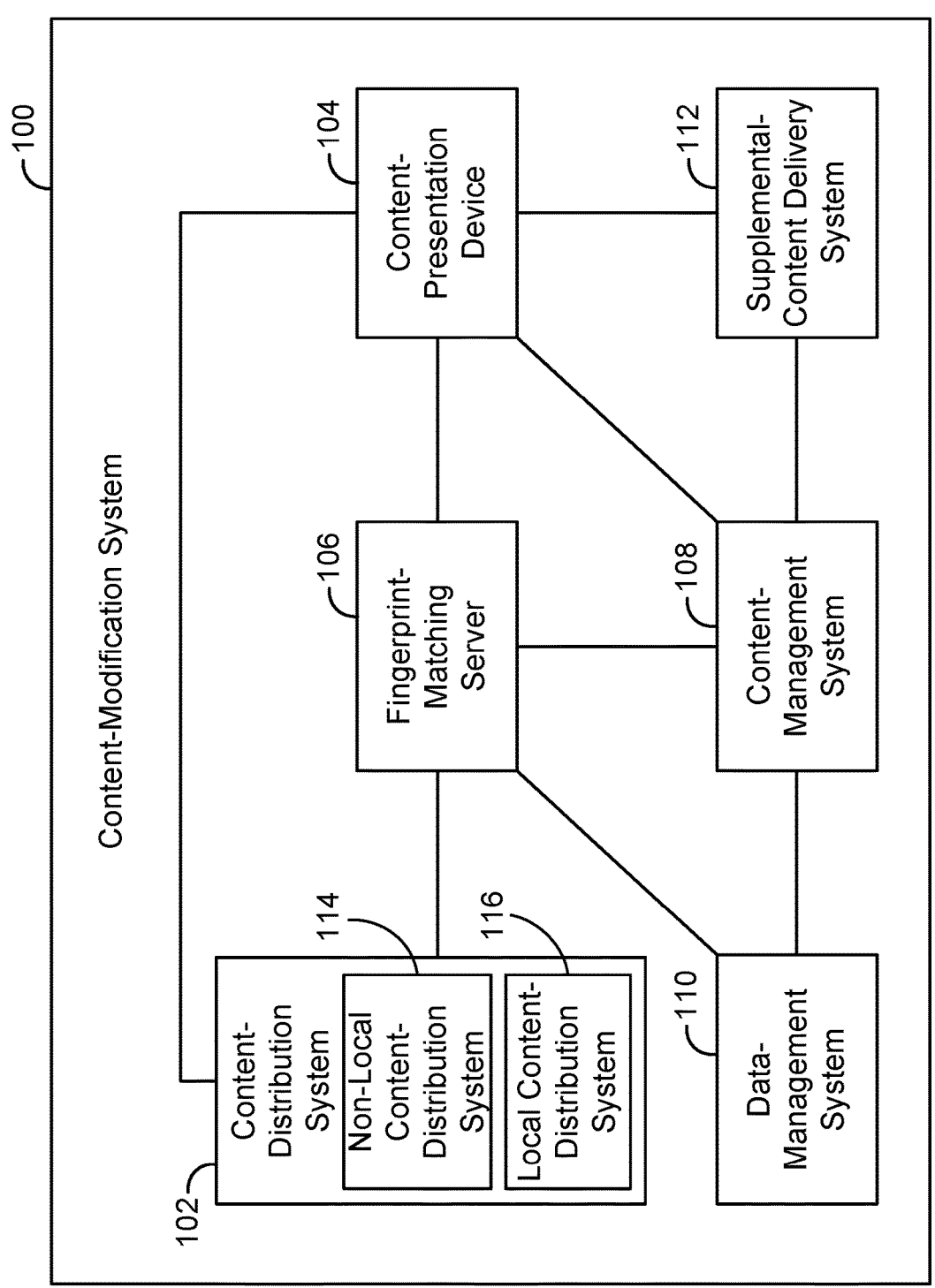
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television sub scribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

In some situations, a content-distribution system can include a non-local content-distribution system component and a local content-distribution system component. In one example, the non-local content-distribution system can be a cable-television head-end that is associated with a cable-television provider. For ease of reference, the non-local content-distribution system is primarily referred to herein as a "national distribution system," although it should be understood that the non-local content-distribution system can be a distribution system that serves a geographic scope that is larger or smaller in scale than a "national" area (e.g., global), but larger in scale than the local content-distribution system component.

Additionally, in an example, the local content-distribution system can be a multi-channel video program distributor (MVPD) head-end that is associated with an MVPD that serves a corresponding local area (e.g., a particular city, metropolitan area, etc.). For ease of reference, the local content-distribution system is primarily referred to herein as the "local distribution system," although it should be understood that the local content-distribution system can be a distribution system that serves a geographic scope that is smaller or larger in scale than described above with respect to a "local" area, but smaller in scale than the non-local content-distribution system component.

The national distribution system can be connected to the local distribution system, which in turn can be connected to a content-presentation device. With this arrangement, the national distribution system can transmit content to the local distribution system, which in can in turn transmit the content to the content-presentation device, which the content-presentation device can receive and output for presentation.

In some cases, the content that the national distribution system transmits to the local distribution system can include what is referred to herein as a "local avail," which is a portion of the content that can serve as a placeholder for local content to be inserted by the local distribution system. The presence of a local avail thus serves as a local content-modification opportunity. Further, insertion of local content can involve placing local content in a linear sequence of content segments where the placeholder is located or replacing existing content in the linear sequence of content segments, where the existing content is designated (e.g., in broadcast schedule data or elsewhere) as a local avail. In one example, the local avail can serve as a placeholder for a local advertisement segment or sequence of consecutive local advertisement segments, such that the local distribution system can replace the local avail with one or more local advertisement segments that are perhaps targeted to users within the local area served by the local distribution system.

Notably, however, when the local distribution system inserts local content in this way, this can cause issues with respect to channel and/or content identification. By way of example, the fingerprint-matching server (or another entity of the content-modification system, such as the content-presentation device itself) can identify a channel on which the content-presentation device is outputting content based on the fingerprint-matching server detecting a match between fingerprint data representing content transmitted by the national distribution system on an identified channel and fingerprint data representing content received by the content-presentation device.

But in the case where the local distribution system inserts local content during a local avail, even though the content-presentation device has not changed channels, the content transmitted by the national distribution system may differ from the content being received by the content-presentation device, at least for a temporary time-period (i.e., a time-period that corresponds to the local avail). Because of this, the corresponding fingerprint data might not match, and thus channel identification can fail (despite the fact that the content-presentation device did not actually change channels). As a result, the corresponding historical content consumption data can be inaccurate (e.g., it might not indicate or suggest that the content-presentation device remained on the same channel during the local avail, despite that being the case).

To address these issues, the present disclosure provides an improved content-modification system that can detect, in near-real-time, when local content is being inserted by a local distribution system and use this detection as a basis for generating more accurate historical content consumption data and/or correcting inaccurate historical content consumption data.

As an example, the content-modification system can detect when local content is being inserted in this way by using a two-phase technique. The first phase involves the content-modification system detecting a local avail within content that the national distribution system transmits to the content-presentation device. And the second phase involves the content-modification system detecting that a local distribution system inserted local content in connection with the local avail.

Efficient detection of the insertion of local content in connection with local avails in turn usefully helps the content-modification system provide accurate historical content consumption data. This can be particularly useful when there are numerous (e.g., hundreds, thousands, or more) content-presentation devices receiving local content as a result of local distribution system(s) inserting the local content in connection with local avails, so as to help reduce or prevent large-scale inaccuracies in the historical content consumption data that the content-modification system can report. The efficient detection of local content insertion and the responsive generation of accurate historical content consumption data, among other operations described herein, are achieved utilizing technical features of the content-modification system, including but not limited to channel identification functionality (e.g., using automatic content recognition to detect fingerprint matches and thus identify which channel a content-presentation device is tuned to) and the ability to monitor viewership on a particular channel. Furthermore, providing accurate historical content consumption data can be useful because it can help the historical content consumption data accurately reflect the content that content-presentation devices present and those content-presentation devices' associated tendencies to change channels, which can be used as bases for carrying out content-modification operations relative to those content-presentation devices (or deciding whether to carry out content-modification operations in the first place).

Thus, the improved content-modification system and associated operations described herein provide a technical solution in the field of the technology of computer network-based content delivery, namely, a solution for detecting the presence of local avails, determining whether local distribution systems have inserted local content in connection with the local avail, and thus generating accurate historical content consumption data. In addition, by dynamically detecting local avails received by content-presentation devices, the present methods and systems can help reduce or remove reliance on external sources that could be unreliable, such as local content schedule data that might provide inaccurate details as to when a local avail occurs.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

As discussed above, the content-distribution system 102 can include a non-local content-distribution system 114 (also referred to herein as "local distribution system 114") and a local content-distribution system 116 (also referred to herein as "national distribution system 116"). In one example, the non-local content-distribution system 114 can be a cable-television head-end that is associated with a cable-television provider, and the local content-distribution system 116 can be a MVPD head-end that is associated with an MVPD that serves a corresponding local area (e.g., a particular city, metropolitan area, etc.).

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
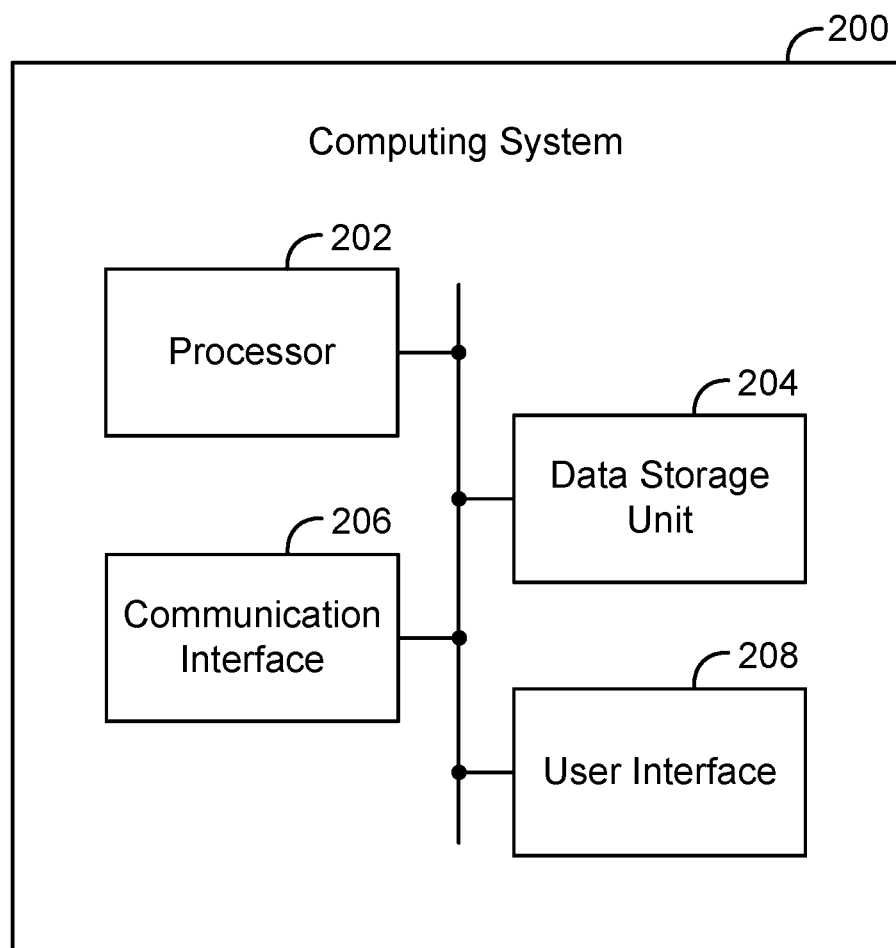
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
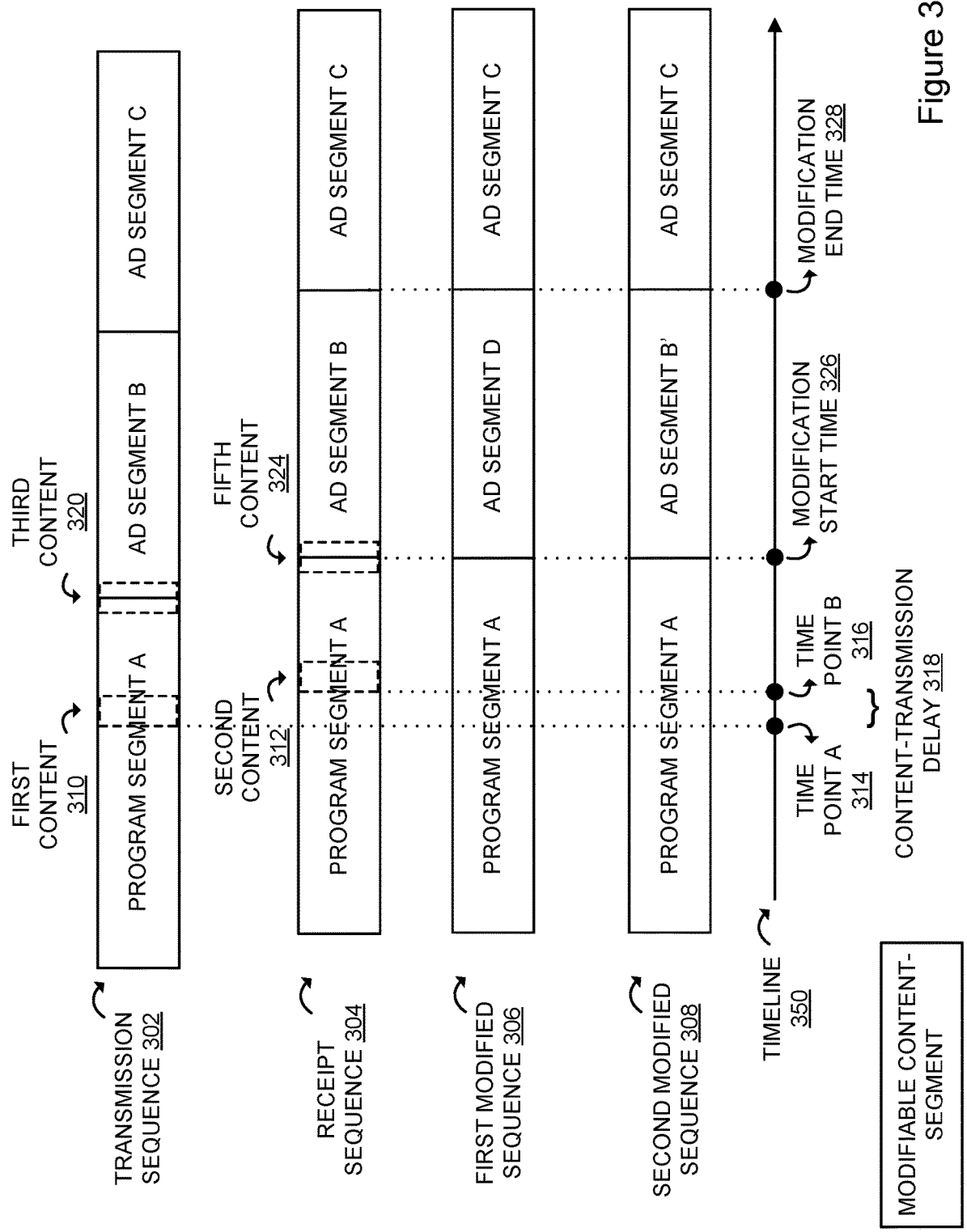
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint generation.

The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. By way of example, responsive to determining that a fingerprint of the second fingerprint data matches multiple fingerprints of the first fingerprint data, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. By way of example, the fingerprint-matching server 106 can transmit, to the content-presentation device 104, at least a portion of the third fingerprint data, and the content-presentation device 104 can increase the frame rate at which the content-presentation device 104 generates the fifth fingerprint data. The content-presentation device 104 can then use the third and fifth fingerprint data—namely, the time-stamps at which the third and fifth fingerprint data were generated—as a basis to establish synchronous lock (e.g., a time offset) between (i) true time defined along a timeline within the content being transmitted by the content-distribution system 102 and (ii) client time defined according to a clock of the content-presentation device 104. As another example, the fingerprint-matching server 106 can establish synchronous lock as described above and then inform the content-presentation device 104.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content-presentation device 104 and/or associated display device. Thus, the FIRST MODIFIED SEQUENCE 306 or the SECOND MODIFIED SEQUENCE 308 can be output on the same channel on which the content-presentation device 104 is tuned—that is, the channel on which the modifiable content-segment is received and on which the content-modification opportunity was identified.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Local Avail Detection and Responsive Actions

As indicated above, the content-modification system 100 can perform a two-phase technique for detecting local avails and responding to the detection of such local avails. The first phase involves the content-modification system detecting a local avail within content that the national distribution system 114 transmits to content-presentation devices on a particular channel. And the second phase involves the content-modification system 100 detecting, for a given one of those content-presentation devices, that a local distribution system (e.g., local distribution system 116) inserted local content in connection with the local avail on the particular channel. Because multiple content-presentation devices can receive local content inserted in connection with a local avail, the content-modification system 100 can perform the second phase for each such content-presentation device. These operations will now be described in more detail.

Although the following operations will be described herein primarily as being performed by the fingerprint-matching server 106, other entities of the content-modification system 100, such as the content-management system 108, could perform one or more of such operations in alternative embodiments.

1. Operations for Detecting Local Avails

The first phase will now be described in greater detail. Over a particular time-period (e.g., one hour) and at a periodic interval (e.g., every second), the fingerprint-matching server 106 can determine a "viewer count," which is defined by an amount of content-presentation devices that are receiving content on a particular channel from a national distribution system 114. The fingerprint-matching server 106 can do this in various ways, such as based on matches detected from hot match attempts and/or cold match attempts associated with various content-presentation devices, as described in greater detail above in connection with channel identification operations.

In some examples, the fingerprint-matching server 106 can use an averaging function and/or other techniques to help smooth the viewer count data and/or otherwise improve the determination of the viewer count. For example, at a periodic interval (e.g., every second), the fingerprint-matching server 106 can determine the viewer count as the average amount of content-presentation devices that are receiving content on the particular channel during a most recent two, three, or four second time-period.

Based on the determined viewer count, the fingerprint-matching server 106 can identify three time-periods within the particular time-period. To begin with, the fingerprint-matching server 106 can identify a first time-period where there is a threshold consistent viewer count for a first threshold duration. This first time-period is also referred to herein as a "pre local avail time-period."

In some examples, the act of identifying the pre local avail time-period where there is the threshold consistent viewer count for the first threshold duration can involve identifying a time-period where the viewer count does not deviate more than a threshold percentage from an average viewer count for a duration selected from a range of 15 to 45 seconds. For instance, the pre local avail time-period can be a time-period where the viewer count is within ±5% from an average viewer count for at least 30 seconds. As another example, the pre local avail time-period can be a time-period where the viewer count is within ±23% from an average viewer count for at least 30 seconds.

Additionally, the fingerprint-matching server 106 can identify a second time-period following the pre local avail time-period where (a) there is a drop in the viewer count by a threshold amount and (b) the drop lasts for a second threshold duration. This second time-period is also referred to herein as an "in local avail time-period."

In some examples, the act of identifying the in local avail time-period can involve identifying a time-period following the pre local avail time-period where (a) there is the drop in the viewer count by at least an amount selected from a range of 30% to 70% and (b) the drop lasts for a duration selected from a range of 30 to 240 seconds. For instance, the in local avail time-period can be a time-period where the viewer count drops by at least 50% and where the drop lasts 120 seconds. In some cases, the second threshold duration can be selected based on an average duration of local avails historically present on the particular channel (e.g., an average duration plus or minus a buffer duration of 2 to 10 seconds).

In other examples, the act of identifying the in local avail time-period can involve identifying a time-period following the pre local avail time-period where the viewer count (a) first begins to deviate more than the threshold percentage from the average viewer count of the pre local avail time period, (b) then drops below a second threshold percentage (e.g., 50%) of the average viewer count of the pre local avail time period, and (c) thereafter remains dropped below the second threshold percentage for a duration selected from a range of 30 to 240 seconds.

Additionally, the fingerprint-matching server 106 can identify a third time-period following the in local avail time-period where the viewer count returns to an amount that is within a threshold range of the threshold consistent viewer count for a third threshold duration. That is, the third time-period can be a time-period where the viewer count comes back to approximately the viewer count from the pre local avail time-period. This third time-period is also referred to herein as a "post local avail time-period."

In some examples, the act of identifying the post local avail time-period can involve identifying a time-period following the in local avail time-period where the viewer count does not deviate more than a threshold percentage from an average viewer count for a duration selected from a range of 30 to 240 seconds. For instance, the post local avail time-period can be a time-period where the viewer count that does not deviate more than 5% from the average viewer count from the pre local avail time-period for at least thirty seconds.

In other examples, the act of identifying the post local avail time-period can involve identifying a time-period following the in local avail time-period where the viewer count first exceeds a threshold viewer count (e.g., half of the previous threshold consistent viewer count), returns to being within the threshold range of the threshold consistent viewer count from the pre local avail time-period, and thereafter does not deviate more than the threshold percentage from that average viewer count for a duration selected from a range of 30 to 240 seconds.

The fingerprint-matching server 106 can use different values for the above-described thresholds on a per channel basis, depending on the respective viewer behavior historically detected on each channel. Furthermore, as described in more detail below, any one or more of the above-described thresholds can be adjusted.

Based on the identified pre, in, and post local avail time-periods, the fingerprint-matching server 106 can detect a local avail within the content, the local avail having a start time (referred to herein as a "local avail start time") and an end time (referred to herein as a "local avail end time"). The fingerprint-matching server 106 can then perform an action associated with the detected local avail.

In one example of detecting the local avail, the fingerprint-matching server 106 can determine the local avail start time to be the start time of the in local avail time-period, and can determine the local avail end time to be the end time of the in local avail time-period. And in some cases, the start time of the in local avail time-period can be the same as, substantially the same as (e.g., within a second or less), or different from (e.g., more than one second of) the end time of the pre local avail time-period, and the end time of the local avail time-period can be the same as, substantially the same as, or different from, the start time of the post local avail time-period.

Figure 5:
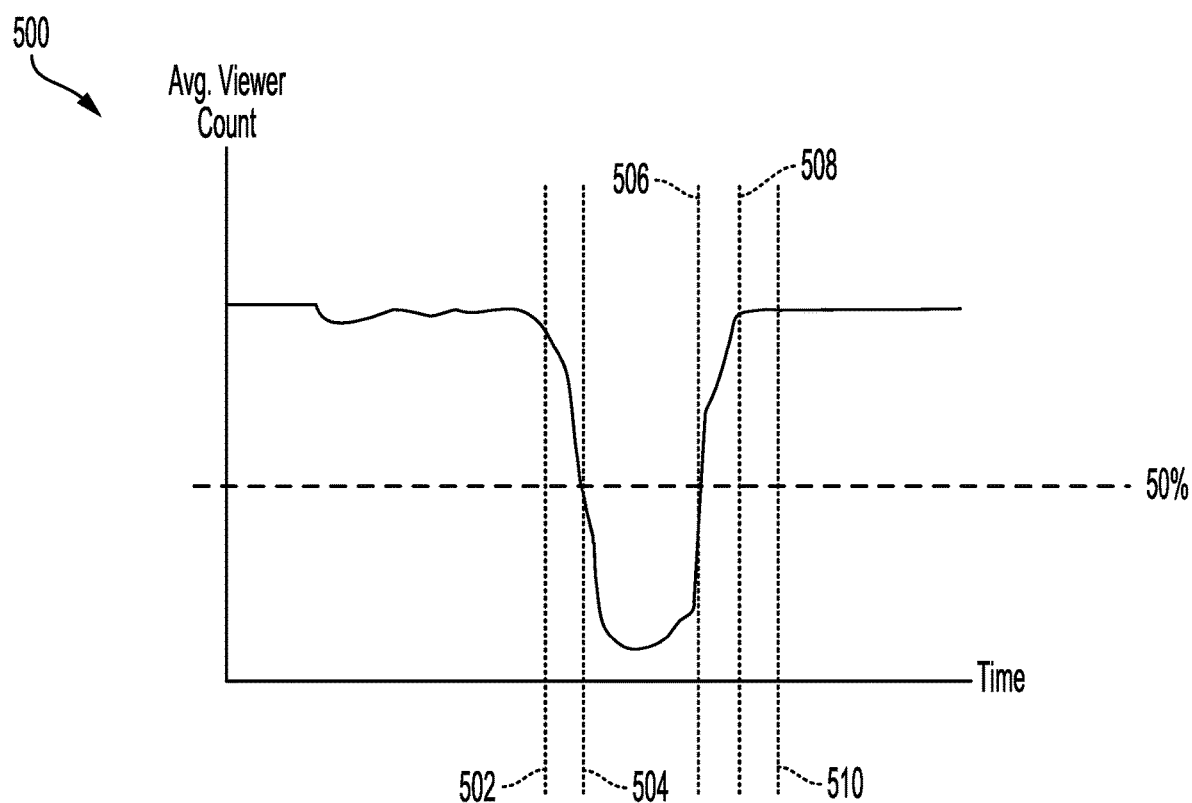
FIG. 5 depicts a graph of an average viewer count for a particular channel over a particular time-period.

In another example, the local avail start and end times can be different from the start and end times of the in local avail time-period. To illustrate this, FIG. 5 depicts a graph 500 of an average viewer count for a particular channel over a particular time-period. FIG. 5 also includes dotted lines that designate start and end times of time-periods detected using the operations described above, as well as dotted lines that designate other time-points at which the fingerprint-matching server 106 performs other operations.

Specifically, in such an example implementation, the fingerprint-matching server 106 can be configured to detect the time-periods by creating a moving average of the viewer count with a particular moving window (e.g., 3 seconds) and iterating through the moving average to detect the local avail. The fingerprint-matching server 106 can first detect that, at time-point 502 (i.e., the end time of the pre local avail time period), there is a dip in the average viewer count, and can thus determine that the conditions for the pre local avail time period are no longer met (e.g., the average viewer count has deviated from the threshold percentage of what it was before), and responsively store an indication that the pre local avail time-period has ended and that the in local avail time-period has begun. The fingerprint-matching server 106 can then continue to check the average viewer count.

The fingerprint-matching server 106 then checks the average viewer count again at time-point 504, comparing the average viewer count to an example threshold of 50%, which can cause the fingerprint-matching server 106 to verify that the in local avail time-period is still occurring at time-point 504. Similarly, the fingerprint-matching server 106 can then detect at time-point 506 that the average viewer count has begun to exceed the threshold of 50%, verify that the conditions for detecting the in local avail time-period have been met up to time-point 506, and, if so, responsively store an indication that the in local avail time-period has ended and that the post local avail time-period has begun and begin to check to see if the post local avail time-period conditions are being met.

The fingerprint-matching server 106 can then detect at time-point 508 that the average viewer count has returned to an amount that is within an example threshold of 5% of what the average viewer count was during the pre local avail time-period. If the fingerprint-matching server 106 detects that this condition holds steady for a threshold duration, the fingerprint-matching server 106 can responsively store an indication that the post local avail time-period start time is time-point 506 and that the end of this threshold duration—namely, time-period 510—is the end time of the post local avail time-period.

Given the above-described analysis of the average viewer count data, the fingerprint-matching server 106 can determine the local avail start and end times in various ways. For instance, the fingerprint-matching server 106 can select the local avail start time to be time-point 502 and can select the local avail end time to be time-point 508. That is, the fingerprint-matching server 106 can select time-point 502 as the local avail start time based on time-point 502 being the time-point at which the dip in the average viewer count began, and can select time-point 508 as the local avail end time based on time-point 508 being the time-point at which the average viewer count first returned to being within a threshold percentage of the original average viewer count from the pre local avail time period.

Other example analyses are possible as well, including alternative time-points selected for use as the pre, in, and post local avail start and end times, as well as for use as the detected local avail start and end times.

In some examples, the act of performing the action associated with the detected local avail can involve detecting, for each of at least one of the content-presentation devices that are receiving the content on the particular channel, whether the local distribution system 116 inserted local content into the content in connection with the detected local avail. Additionally, the act of performing the action associated with the detected local avail can involve updating historical content consumption data associated with each content-presentation device for which the fingerprint-matching server 106 makes a detection that the local distribution system 116 inserted local content into the content in connection with the detected local avail. These actions will be described in more detail with respect to phase two of the disclosed two-phase technique.

In some situations, the fingerprint-matching server 106 can access data of a local avail schedule (e.g., made available by the local distribution system) and/or can use data extracted from the content (e.g., in the form of a SCTE signal) (collectively referred to herein as "local content intel data") to help validate the accuracy of the above-described operations in detecting a local avail and/or to perform additional operations to help hone in on a more accurate local avail start time and/or end time of the detected local avail.

In some examples, the act of performing the action associated with the detected local avail can involve comparing the local content intel data with the detected local avail to determine whether the respective start times and/or end times match. In some instances, the local avail start time and/or end time will match (e.g., be within a threshold degree of similarity of, such as within 0 to 3 seconds of, or within 0 to 30 seconds of) the start time and/or end time specified by the local content intel data. In other instances, however, the local avail start time and/or end time might not match (e.g., be within a threshold degree of similarity of, such as within 0 to 3 seconds of, or within 0 to 30 seconds of) a respective start time and/or respective end time as specified by the local content intel data, and thus the duration of the detected local avail might not match the duration of the local avail specified in the local content intel data.

A mismatch between the detected local avail and the local content intel data can occur for various reasons. For example, a local avail may last longer than specified in the local avail schedule. As another example, a scheduled local avail may extend beyond the particular time-period in which the fingerprint-matching server 106 is currently considering, and thus the fingerprint-matching server 106 might not get to consider data associated with an ending portion of the scheduled local avail. For instance, the local content intel data can specify a scheduled local avail from 6:59 pm to 7:01 pm, and if the fingerprint-matching server 106 is analyzing a particular time-period of 6:00 μm to 7:00 pm, it can miss the last minute of the scheduled local avail. As such, the fingerprint-matching server 106 can also detect pre, in, and post local avail time-periods in longer time-periods (e.g., two hour time-periods) or after combining data from the particular time-period with at least a portion of another time-period that sequentially follows the particular time-period.

As yet another example, there may be an unexpected amount of growth in the viewer count when a local avail ends. In particular, during the post local avail time-period, the viewer count might grow to a point where it far exceeds the average viewer count that was present during the pre local avail time-period. And as yet another example, it may simply be the case that the local avail schedule is inaccurate and does not include at least one of the local avails detected using the operations described above.

In line with the discussion above, the action associated with the detected local avail that the fingerprint-matching server 106 performs can be performed in situations where a mismatch is detected. For example, the action can further involve detecting the mismatch and responsively updating the start time specified in the local content intel data to be the determined start time.

In line with the discussion above, the fingerprint-matching server 106 can correct inaccuracies in the local content intel data. In particular, the act of performing the action associated with the detected local avail can further involve detecting a mismatch between the start time and/or end time of the detected local avail and the corresponding start time and/or end time of the local avail specified in the local content intel data and responsively (i) updating the start time specified in the local content intel data to be the determined start time of the detected local avail (e.g., to be the start time of the in local avail time-period) and/or (ii) updating the end time specified in the local content intel data to be the determined end time of the detected local avail (e.g., to be the time-point at which the average viewer count returned to being within the threshold percentage of the pre local avail time-period stable average viewer count). Additionally, the fingerprint-matching server 106 can transmit the updated local content intel data to the local content-distribution system or another computing system associated with the local content intel data. Alternatively, instead of updating the local content intel data itself, the fingerprint-matching server 106 can transmit, to the local content distribution system or another computing system, data indicating the detected local avail and its start/end time, so as to inform such a computing system of the detected discrepancy between the start times and/or end times.

In some cases, detecting a mismatch can cause the fingerprint-matching server 106 to tune one or more of the thresholds involved in identifying the pre, in, and post local avail time-periods. As such, the act of performing the action associated with the detected local avail can further involve adjusting one or more of the thresholds associated with one or more of the pre, in, and post local avail time-periods in response to detecting the mismatch.

For example, the fingerprint-matching server 106 can determine an offset between the start time of the in local avail time-period and the start time specified by the local content intel data and use the determined offset to adjust one or more of the first, second, and third threshold durations described above. The fingerprint-matching server 106 can then use the adjusted duration(s) the next time the fingerprint-matching server 106 performs the operations described above to detect a local avail. For example, consider a situation in which a local avail was detected using a second threshold duration of two minutes, there is a match detected between the local avail start time and the start time specified by the local content intel data, and the fingerprint-matching server 106 determines a local avail end time of 00:20:30 (i.e., a timestamp of twenty minutes and thirty seconds), but the local content intel data specifies a local avail end time of 00:19:30 (i.e., a timestamp of nineteen minutes and thirty seconds). In this situation, the fingerprint-matching server 106 can determine an offset of one minute and thus reduce the second threshold duration by one minute. Thereafter, the fingerprint-matching server 106 can detect a subsequent local avail using the adjusted second threshold duration when identifying the in local avail time-period.

In some situations, there may be multiple local avails that occur within the particular time-period, and the fingerprint-matching server 106 can use the operations described above to detect the multiple local avails within that time-period.

Figure 6A:
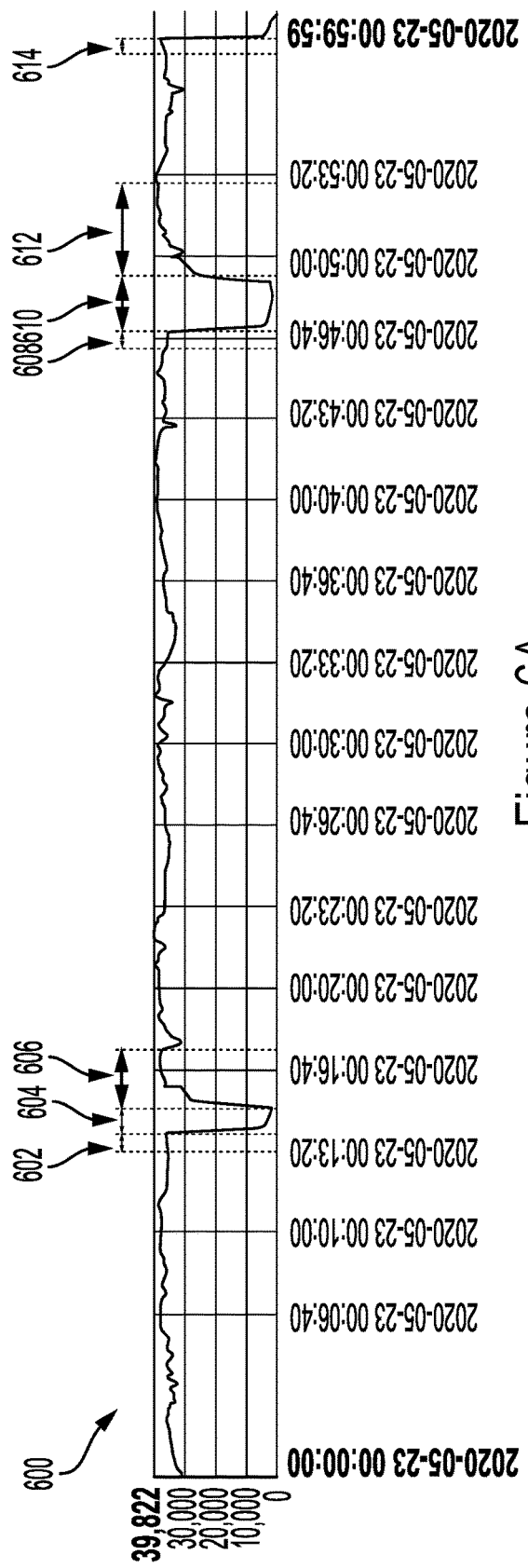
FIGS. 6A, 6B, and 6C depicts graphs of average viewer counts for channels over particular time-periods.
Figure 6B:
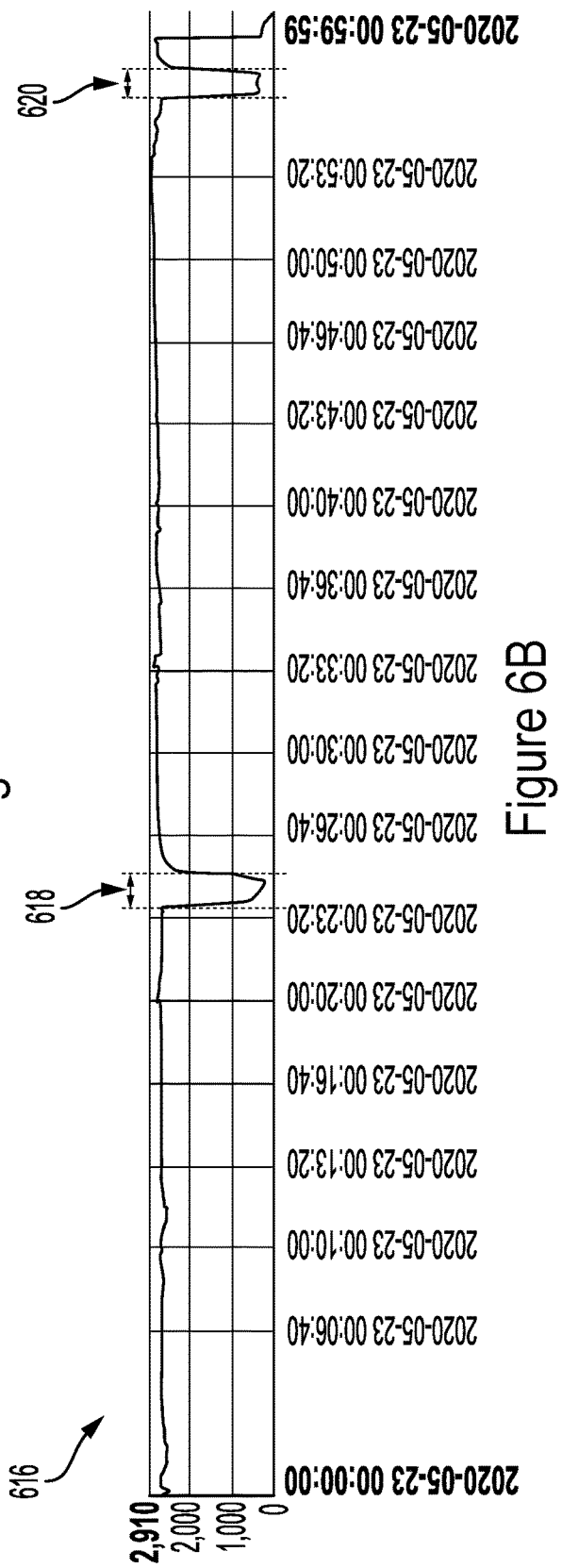
Figure 6C:
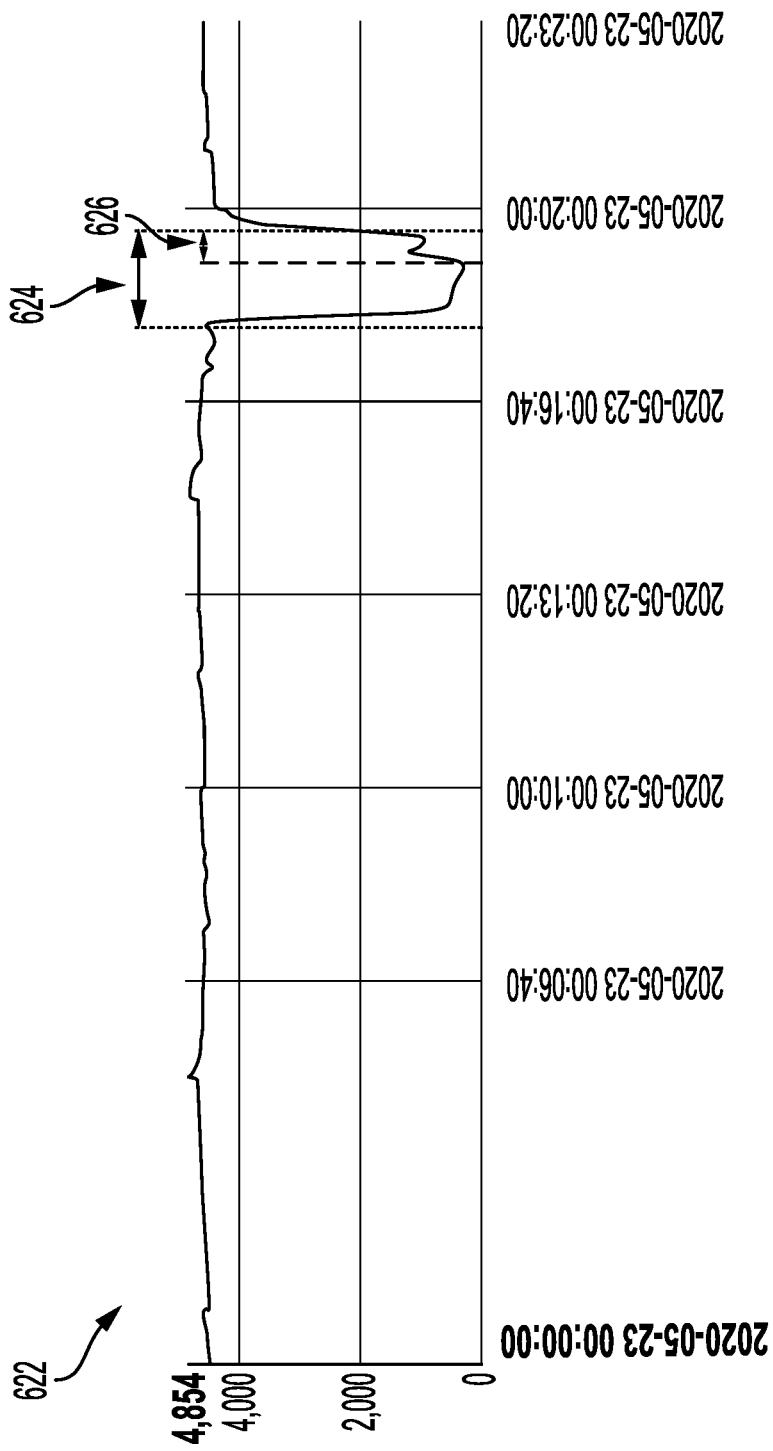

FIGS. 6A, 6B, and 6C depict graphs of average viewer counts for particular channels over particular time-periods, as well as dotted lines that designate start and end times of time-periods detected using the operations described above.

FIG. 6A depicts a graph 600 of an average viewer count for a particular channel over a particular time-period of one hour. As shown in FIG. 6A, the fingerprint-matching server 106 can detect two instances of a pre, in, and post local avail time-period, of which the respective in local avail time-period corresponds to a respective local avail. In particular, using the operations described above, the fingerprint-matching server 106 can detect pre local avail time-period 602, followed by in local avail time-period 604, followed by post local avail time-period 606, where in local avail time-period 604 is the local avail.

Further, within the same particular time-period the fingerprint-matching server 106 detects pre local avail time-period 608, in local avail time-period 610, and post local avail time-period 612, where in local avail time-period 610 is the local avail. Still further, the fingerprint-matching server 106 also detects pre local avail time-period 614, but does not detect associated in and post local avail time-periods due to a local avail occurring at the end of the hour.

Table 1 below includes the start and end times for the two detected local avails discussed above. Table 2 then includes start and end times that the local content intel data specifies for local avails. As shown in Table 1 and Table 2, and assuming a match between the detected local avails and the local content intel data occurring when the fingerprint-matching server 106 determines that the start and end times are within a threshold similarity of 30 seconds, by way of example, the fingerprint-matching server 106 detects that the detected local avails match the local avails specified by the local content intel data.

TABLE 1

| Local Avail Start Time Specified by Local Content Intel Data | Local Avail End Time Specified by Local Content Intel Data |
| --- | --- |
| 2020-05-23 00:14:00 | 2020-05-23 00:15:00 |
| 2020-05-23 00:46:52 | 2020-05-23 00:48:52 |

TABLE 2

| Local Avail Start Time Detected by Fingerprint-Matching Server | Local Avail End Time Detected by Fingerprint-Matching Server |
| --- | --- |
| 2020-05-23 00:13:57 | 2020-05-23 00:15:23 |
| 2020-05-23 00:46:52 | 2020-05-23 00:49:19 |

FIG. 6B depicts another graph 616 of an average viewer count for a particular channel over a particular time-period of one hour. For simplicity, only the detected in local avail time-periods 618, 620 of the detected local avails are shown. Table 3 below includes the start and end times of the detected local avails. In this example situation, the local avails that the fingerprint-matching server 106 identifies are not present in the local content intel data.

TABLE 3

| Local Avail Start Time Detected by Fingerprint-Matching Server | Local Avail End Time Detected by Fingerprint-Matching Server |
| --- | --- |
| 2020-05-23 00:23:44 | 2020-05-23 00:25:12 |
| 2020-05-23 00:56:22 | 2020-05-23 00:57:40 |

FIG. 6C depicts a portion of another graph 622 of an average viewer count for a particular channel. In particular, FIG. 6C along with Tables 4 and 5 below depict an example situation in which a local avail that the fingerprint-matching server 106 identifies (as represented by in local avail time-period 624) is misaligned, and thus offset from, the local avail specified by the local content intel data. The offset 626 is shown in the graph. As shown in Tables 4 and 5 below, the respective local avail start times are almost the same, but the respective local avail end times are offset by 49 seconds.

TABLE 4

| Local Avail Start Time Specified by Local Content Intel Data | Local Avail End Time Specified by Local Content Intel Data |
| --- | --- |
| 2020-05-23 00:17:52 | 2020-05-23 00:18:52 |

TABLE 5

| Local Avail Start Time Detected by Fingerprint-Matching Server | Local Avail End Time Detected by Fingerprint-Matching Server |
| --- | --- |
| 2020-05-23 00:17:58 | 2020-05-23 00:19:41 |

In this case, adjusting the second threshold duration associated with the in local avail time-period based on the offset, such as by reducing the second threshold duration by approximately 50 seconds, can result in the detected local avail matching (e.g., being within a threshold similarity of) the local avail specified in the local content intel data.

Figure 7:
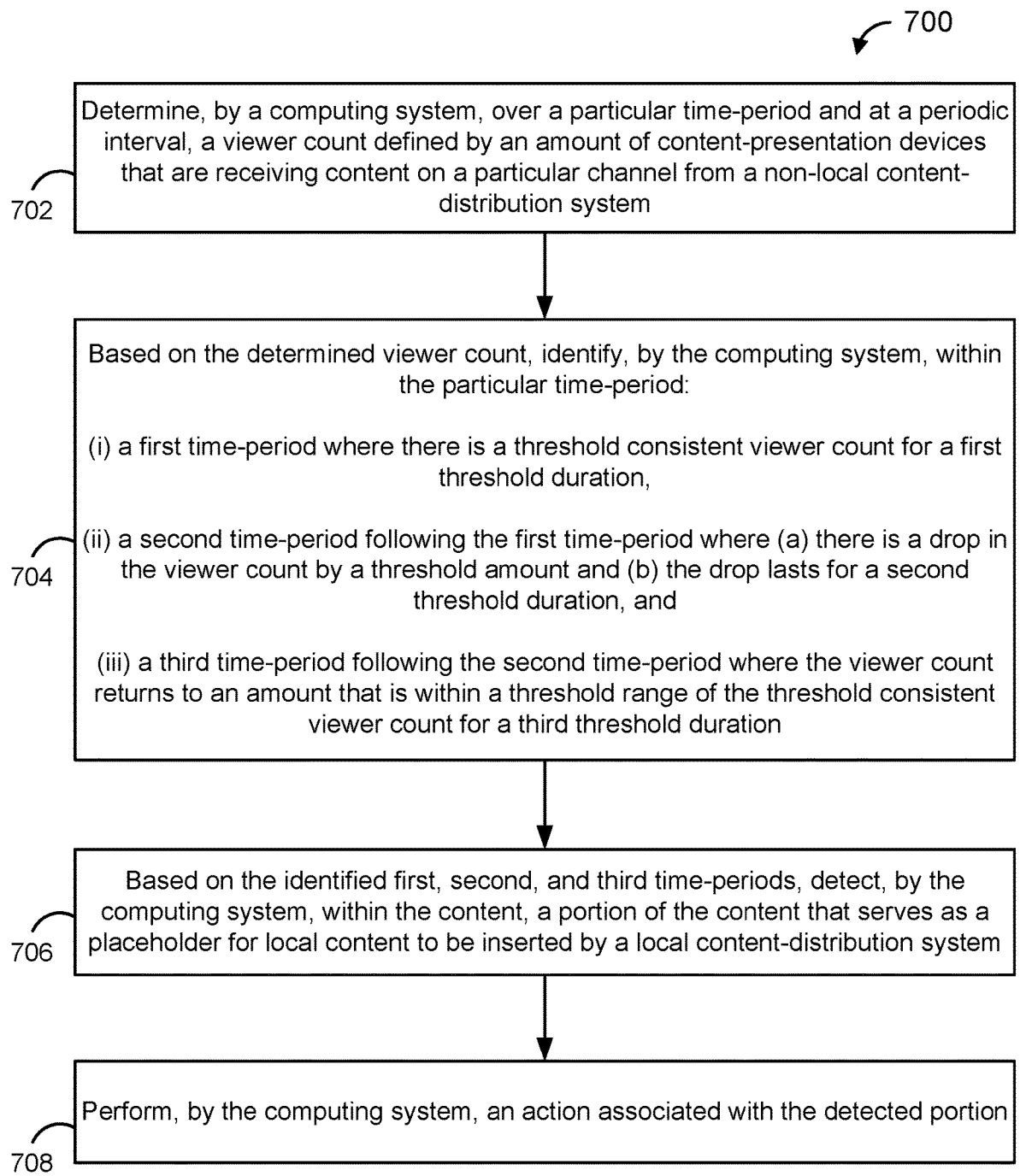
FIG. 7 is a flow chart of an example method.

FIG. 7 is a flow chart of an example method 700. At block 702, the method 700 includes determining, by a computing system, over a particular time-period and at a periodic interval, a viewer count defined by an amount of content-presentation devices that are receiving content on a particular channel from a non-local content-distribution system.

At block 704, the method 700 includes based on the determined viewer count, identifying, by the computing system, within the particular time-period: (i) a first time-period where there is a threshold consistent viewer count for a first threshold duration, (ii) a second time-period following the first time-period where (a) there is a drop in the viewer count by a threshold amount and (b) the drop lasts for a second threshold duration, and (iii) a third time-period following the second time-period where the viewer count returns to an amount that is within a threshold range of the threshold consistent viewer count for a third threshold duration.

At block 706, the method 700 includes based on the identified first, second, and third time-periods, detecting, by the computing system, within the content, a portion of the content that serves as a placeholder for local content to be inserted by a local content-distribution system.

At block 708, the method 700 includes performing, by the computing system, an action associated with the detected portion.

In some embodiments, the act of identifying the first time-period where there is the threshold consistent viewer count for the first threshold duration involves identifying the first time-period where the viewer count does not deviate more than a threshold percentage from an average viewer count for a duration selected from a range of 15 to 45 seconds.

In some embodiments, the act of identifying the second time-period following the first time-period where (a) there is the drop in the viewer count by the threshold amount and (b) the drop lasts for the second threshold duration involves identifying the second time-period following the first time-period where (a) there is the drop in the viewer count by an amount selected from a range of 30% to 70% and (b) the drop lasts for a duration selected from a range of 30 to 240 seconds.

In some embodiments, the act of identifying the third time-period following the second time-period where the viewer count returns to the amount that is within the threshold range of the threshold consistent viewer count for the third threshold duration involves identifying the third time-period following the second time-period where the viewer count does not deviate more than a threshold percentage from an average viewer count for a duration selected from a range of 30 to 240 seconds.

In some embodiments, the act of detecting the portion involves determining a start time of the portion based on a start time of the second time-period. Further, in such embodiments, the act of performing the action involves detecting a mismatch between the detected portion and local content intel data received from the local content-distribution system, where the local content intel data specifies a start time for the detected portion different from the determined start time, and further involves in response to detecting the mismatch, updating the start time specified in the local content intel data to be the determined start time.

In some embodiments, the act of detecting the portion involves determining a start time of the portion based on a start time of the second time-period and determining an end time of the portion based on a time-point at which the viewer count returns to the threshold consistent viewer count of the first time-period, and the act of performing the action involves transmitting, to the local content-distribution system, data indicating the detected portion and including the determined start time and end time.

In some embodiments, the act of performing the action involves detecting, for each of at least one of the content-presentation devices receiving the content on the particular channel, whether the local content-distribution system inserted local content into the content in connection with the detected portion. Further, in some of such embodiments, the act of performing the action further involves updating historical content consumption data associated with each content-presentation device for which a detection is made that the local content-distribution system inserted local content into the content in connection with the detected portion.

2. Operations for Detecting when a Local Distribution System Inserted Local Content in Connection with a Detected Local Avail and Correcting Historical Content Consumption Data As discussed above, when the fingerprint-matching server 106 detects a local avail within content that the national distribution system 114 transmits to content-presentation devices on a particular channel, the second phase involves the content-modification system 100 detecting, on a per content-presentation device basis for that particular channel, whether a local distribution system (e.g., the local distribution system 116) inserted local content into the content in connection with the local avail on that particular channel. Based on the knowledge of which content-presentation devices received local content as a result of a local distribution system inserting the local content in connection with the local avail on the particular channel, the fingerprint-matching server 106 can make informed decisions on how to correct any inaccurate historical content consumption data. For instance, as indicated above, when a local distribution system inserts local content in connection with a local avail, the corresponding historical content consumption data for a content-presentation device can be inaccurate (e.g., it might not indicate or suggest that the content-presentation device remained on the same channel during the local avail, despite that being the case).

The second phase will now be described in greater detail. Over a particular time-period (e.g., one hour) and at a periodic interval (e.g., every second), the fingerprint-matching server 106 can detect match data indicating whether reference fingerprint data representing content transmitted by the national content-distribution system on the particular channel matches query fingerprint data representing content received by a content-presentation device (e.g., content-presentation device 104) on the particular channel. That is, the match data can indicate, for each match attempt, the presence of absence of a match between reference fingerprint data and query fingerprint data.

The fingerprint-matching server 106 can do this in various ways, such as based on matches detected from hot match attempts and/or cold match attempts associated with various content-presentation devices, as described in greater detail above in connection with channel identification operations. Further, the values selected for use as particular time-period and periodic interval can be the same or different than those used in connection with phase one.

As with determining the viewer count as described above in phase one, in connection with determining the match data, the fingerprint-matching server 106 can use an averaging function and/or other techniques to help smooth the match data and/or otherwise improve the determination of the match data. For example, at a periodic interval (e.g., every second), the fingerprint-matching server 106 can determine and consider an average number of fingerprint matches over a most recent two, three, or four second period, for instance.

Based on the detected match data, the fingerprint-matching server 106 can identify three time-periods within the particular time-period. To begin with, the fingerprint-matching server 106 can identify a first time-period where there is threshold consistent fingerprint data matching occurring for a first threshold duration. This first time-period is also referred to herein as a "pre local avail match time-period."

In an example, the fingerprint-matching server 106 can determine that threshold consistent fingerprint matching has occurred over the first threshold duration when the match data indicates that at least a particular threshold percentage of match attempts during that first threshold duration resulted in a detected match (e.g., at least 95% of match attempts were matches). Other ways of determining threshold consistent fingerprint matching are possible as well.

In some examples, the act of identifying the pre local avail match time-period where there is threshold consistent fingerprint data matching occurring for a first threshold duration can involve identifying a time-period where there is threshold consistent fingerprint data matching occurring for a duration selected from a range of 2 to 4 minutes. For instance, the pre local avail match time-period can be a time-period where there is threshold consistent fingerprint data matching occurring for at least 3 minutes.

Additionally, the fingerprint-matching server 106 can identify a second time-period following the pre local avail match time-period where (a) there is a threshold consistent lack of matching for a second threshold duration, and (b) the second time-period corresponds to a detected local avail on the particular channel. This second time-period is also referred to herein as "in local avail match time-period."

Phrased another way, following the pre local avail match time-period, the fingerprint-matching server 106 looks for a time-period having the same, or approximately the same (i.e., within a threshold time, such as a few seconds), start time and end time as the local avail detected during phase one. And in order to help determine whether a local distribution system inserted local content in connection with the local avail, the fingerprint-matching server 106 assesses whether a threshold consistent lack of matching occurred for the second threshold duration (which can be a duration that is shorter, longer, or the same as the duration of the detected local avail), which could occur if such a local distribution system did in fact insert local content.

In some examples, the act of identifying the in local avail match time-period where (a) there is the threshold consistent lack of matching for the second threshold duration, and (b) the in local avail match time-period corresponds to the detected local avail can involve identifying a time-period where (a) more than a threshold percentage (e.g., 90% or more) of match attempts from the match data indicate a mismatch between the reference fingerprint data and the query fingerprint data for a duration selected from a range of 30-120 seconds, and (b) the in local avail match time-period has a start time and end time that are within a threshold time from a start time and an end time of the detected local avail. For instance, the in local avail match time-period can be a time-period where 100% of match attempts from the match data indicate a mismatch and the start/end times of the second-time period are within two seconds of the corresponding start/end times of the detected local avail.

Additionally, the fingerprint-matching server 106 can identify a third time-period following the in local avail match time-period where there is threshold consistent fingerprint data matching occurring for a third threshold duration. This third time-period is also referred to herein as a "post local avail match time-period."

In some examples, the act of identifying the post local avail match time-period following the in local avail match time-period where there is threshold consistent fingerprint data matching occurring for the third threshold duration can involve identifying a time-period where there is threshold consistent fingerprint data matching occurring for a duration selected from a range of 30 to 240 seconds. For instance, the post local avail match time-period can be a time-period where there is threshold consistent fingerprint data matching occurring for at least 30 seconds. The determination as to whether threshold consistent fingerprint data matching is occurring for the third threshold duration can be made as indicated above.

Based on the identified pre, in, and post local avail match time-periods, the fingerprint-matching server 106 can detect that the local distribution system 116 inserted local content into the content received on the particular channel in connection with the detected local avail. And in response to detecting that the local distribution system 116 inserted local content into the content received on the particular channel in connection with the detected local avail, the fingerprint-matching server 106 can perform an action.

In some examples, the fingerprint-matching server 106 can be configured to interpret the detection that the local distribution system 116 inserted local content into the content received on the particular channel in connection with the detected local avail as an indication that the content-presentation device 104 did not change channels from the particular channel to another channel during the in local avail match time period. As such, the act of performing the action can involve the fingerprint-matching server 106 updating historical content consumption data associated with the content-presentation device 104 to indicate that the content-presentation device 104 remained tuned to the particular channel during the in local avail match time-period.

Alternatively, the fingerprint-matching server 106 can cause another computing system of the content-modification system 100 (e.g., the content-management system 108) or a computing system outside of the content-modification system 100 to update the historical content consumption data, such as by sending an instruction to update the historical content consumption data or by sending other data that such computing system(s) would be configured to interpret as an instruction to make the update. Further, performing the action can also involve the fingerprint-matching server 106 transmitting the updated historical content consumption data to the national distribution system 114, the local distribution system 116, or another computing system.

The fingerprint-matching server 106 can cause the historical content consumption data to be updated in various ways. For example, the fingerprint-matching server 106 can cause one or more types of data to be updated, including but not limited to (i) a channel identifier of the particular channel, (ii) a program identifier for the program segment that the content-presentation device 104 viewed, (iii) content/credit time (i.e., the start and end time of when the content on the particular channel was broadcast, as opposed to when the content was viewed by the content-presentation device), (iv) a match source (i.e., whether the content-presentation device 104 was watching the content in real-time on the particular channel or rather was watching a recorded version of the content, such as from a digital video recorder (DVR)), (v) a program offset indicating a timestamp of when the content-presentation device 104 began watching the content on the particular channel, and/or (vi) a time-period during which the content-presentation device 104 was receiving content on the particular channel. Other types of data could be updated as well, additionally or alternatively to those noted above.

In addition to updating historical content consumption data on a per content-presentation device basis, the fingerprint-matching server 106 can perform the above-described operation for each of a plurality of content-presentation devices that were tuned to the particular channel and update viewership data that indicates viewership activity on the particular channel. For instance, viewership data can provide a total count of content-presentation devices tuned to the particular channel over time. In essence, the viewership data for a given channel can be an aggregate of the historical content consumption data for numerous content-presentation devices relative to that channel.

As such, in some examples, the fingerprint-matching server 106, having determined that each of the plurality of content-presentation devices received local content inserted by local distribution systems in connection with the detected local avail, can store, in a non-transitory computer-readable storage medium, viewership data associated with the particular channel that indicates that each of the plurality of content-presentation devices remained tuned to the particular channel during the in local avail match time-period.

In connection with the phase one and phase two operations discussed above, various thresholds, ranges, etc., have been provided as illustrative examples. It should be understood however that other thresholds, ranges, etc. can also be used, and as such the system can be configured in a variety of different ways, as desired (based on desired tolerance levels, etc.).

Figure 8A:
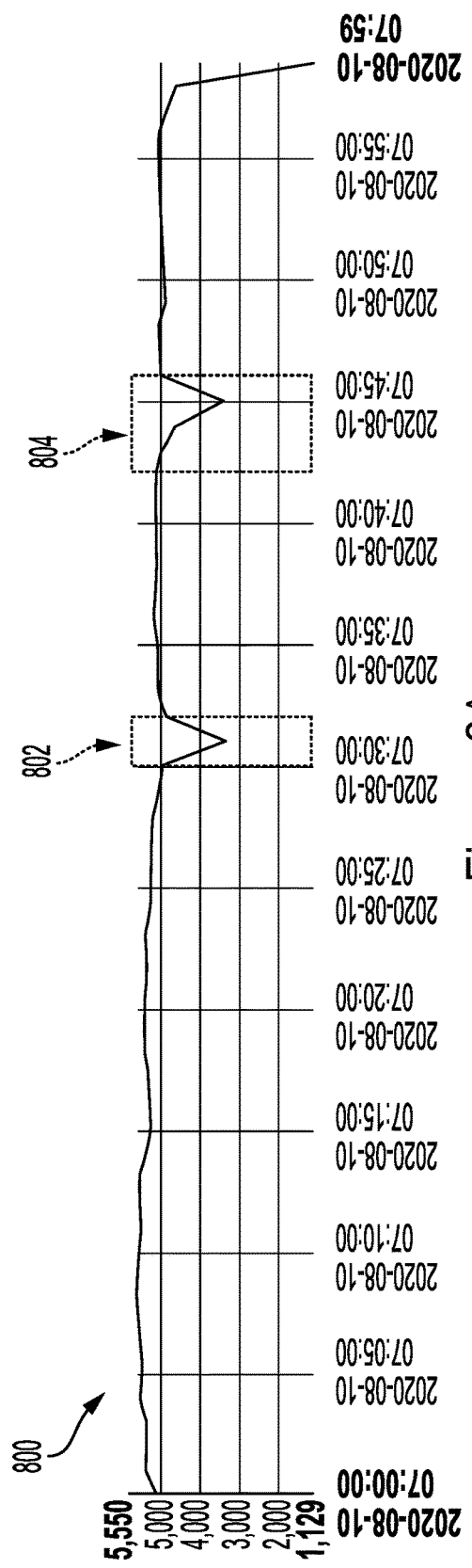
FIGS. 8A and 8B each depict viewership data in the form of a graph of a total count of content-presentation devices tuned to particular channel over time.
Figure 8B:
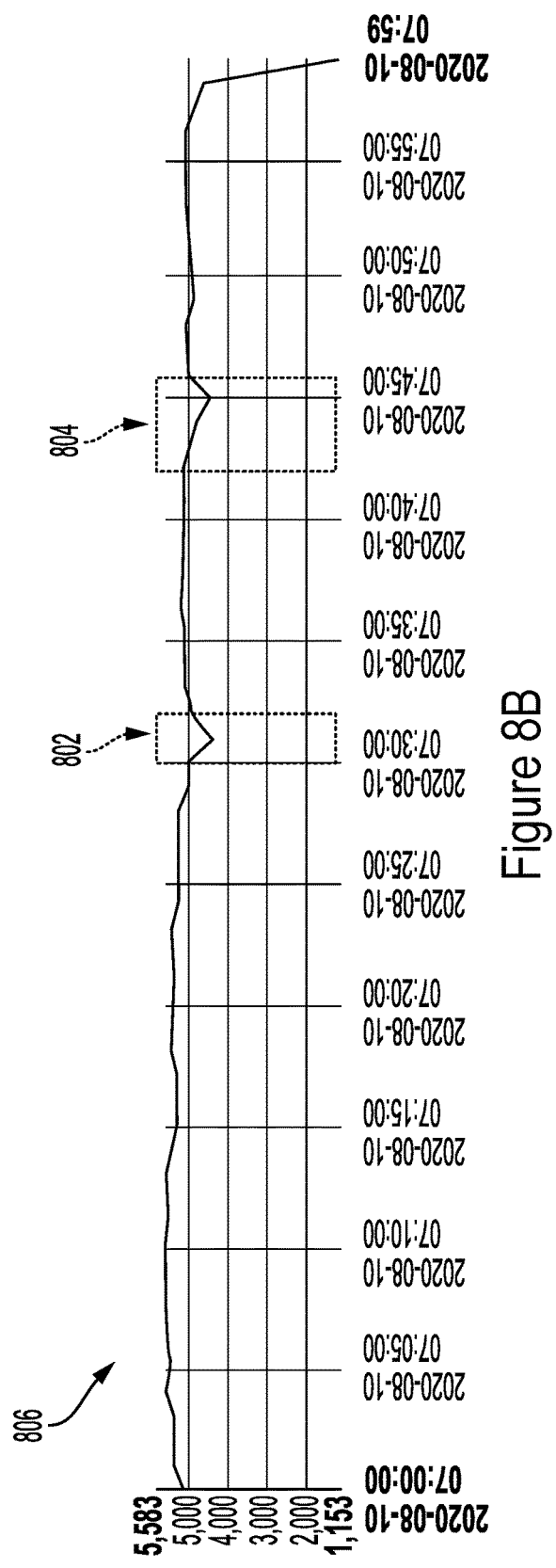

FIGS. 8A and 8B, each depict viewership data in the form of a graph of a total count of content-presentation devices tuned to a particular channel over time.

In particular, FIG. 8A depicts viewership data 800 for the particular channel over a time-period of one hour. In this viewership data, before the significant drop at the end of the hour (which might be due to a program segment ending and the majority of the content-presentation devices turning off or tuning away), there are two other large drops 802, 804 in the total count of content-presentation devices tuned to the channel, each between approximately 1500 and 2000 devices. As discussed above, these two drops 802, 804 might be due to at least some of the content-presentation devices having received inserted local content that was inserted by the local distribution system 116 in connection with local avails. Thus, using the two-phase technique described above, the fingerprint-matching server 106 can detect two local avails and determine how many content-presentation devices received local content in connection with the detected local avails. The fingerprint-matching server 106 can then correct the viewership data 800 for the particular channel.

Accordingly, FIG. 8B depicts corrected viewership data 806 for the particular channel over the same one hour time-period. As shown, the adjustments that the fingerprint-matching server 106 makes can result in the two drops 802, 804 being much less (i.e., approximately 1000 devices less) than the viewership data shown in FIG. 8A. In some cases, the fingerprint-matching server 106 can then transmit the corrected viewership data 806 to one or more computing systems not shown in FIG. 8B, such as the local distribution system 116, the national distribution system 114, and/or another computing system.

Figure 9:
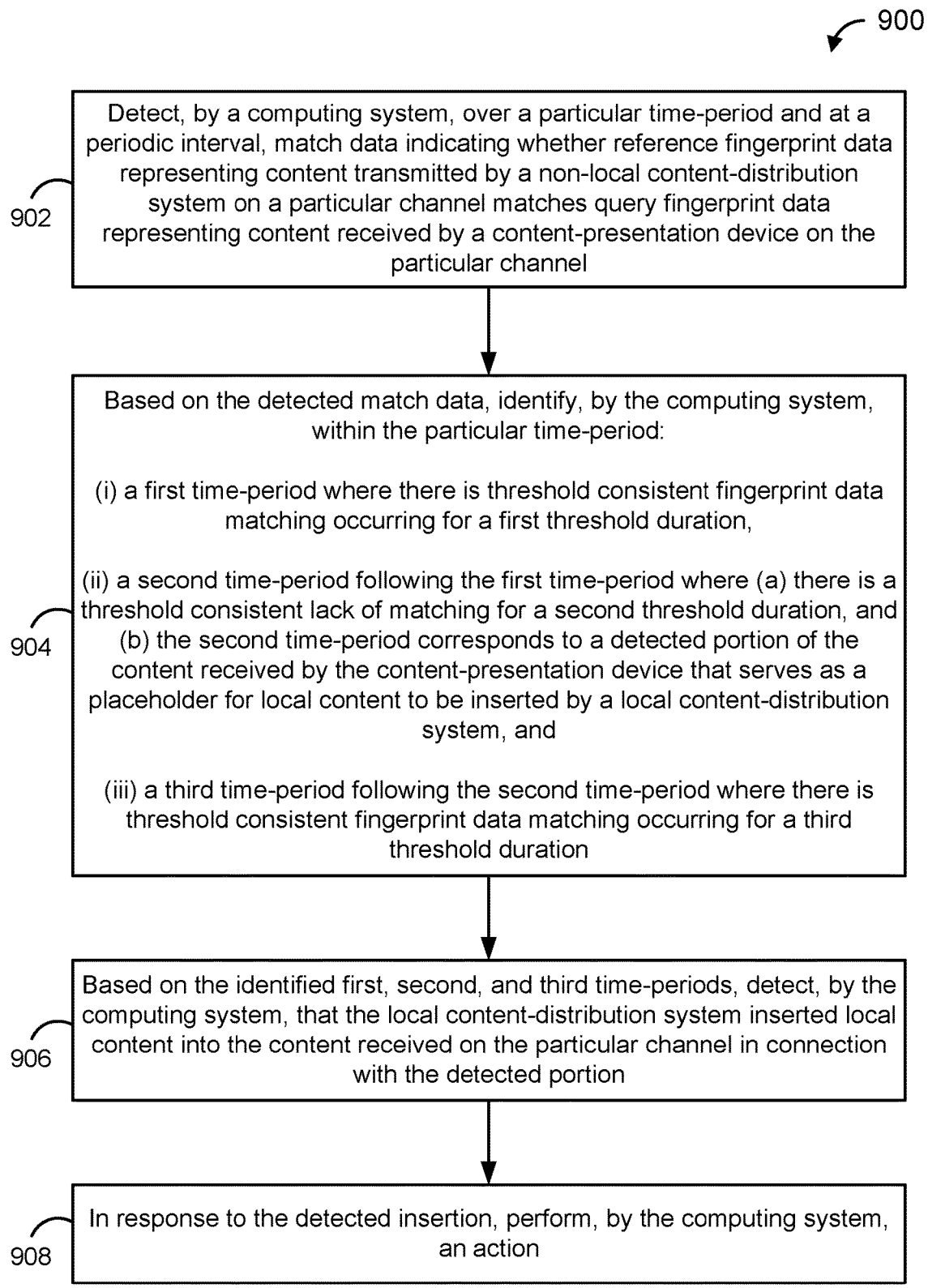
FIG. 9 is a flow chart of an example method.

FIG. 9 is a flow chart of an example method 900. At block 902, the method 900 includes detecting, by a computing system, over a particular time-period and at a periodic interval, match data indicating whether reference fingerprint data representing content transmitted by a non-local content-distribution system on a particular channel matches query fingerprint data representing content received by a content-presentation device on the particular channel.

At block 904, the method 900 includes based on the detected match data, identifying, by the computing system, within the particular time-period: (i) a first time-period where there is threshold consistent fingerprint data matching occurring for a first threshold duration, (ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and (iii) a third time-period following the second time-period where there is threshold consistent fingerprint data matching occurring for a third threshold duration.

At block 906, the method 900 includes based on the identified first, second, and third time-periods, detecting, by the computing system, that the local content-distribution system inserted local content into the content received on the particular channel in connection with the detected portion.

At block 908, the method 900 includes in response to the detected insertion, performing, by the computing system, an action.

In some embodiments, the act of performing the action involves updating historical content consumption data associated with the content-presentation device to indicate that the content-presentation device remained tuned to the particular channel during the second time-period.

In some embodiments, the method 900 is performed for each of a plurality of content-presentation devices, and the method 900 can further involve storing, in a non-transitory computer-readable storage medium, viewership data associated with the particular channel that indicates that each of the plurality of content-presentation devices remained tuned to the particular channel during the second time-period.

In some embodiments, the act of identifying the first time-period where there is threshold consistent fingerprint data matching occurring for the first threshold duration can involve identifying the first time-period where there is threshold consistent fingerprint data matching occurring for a duration selected from a range of 2 to 4 minutes.

In some embodiments, the act of identifying the second time-period where (a) there is the threshold consistent lack of matching for the second threshold duration, and (b) the second time-period corresponds to the detected portion of the content received by the content-presentation device that serves as the placeholder for local content to be inserted by the local content-distribution system can involve identifying the second time-period where (a) more than a threshold percentage of match attempts from the match data indicate a mismatch between the reference fingerprint data and the query fingerprint data for a duration selected from a range of 30-120 seconds, and (b) the second time-period has a start time and end time that are within a threshold time from a start time and an end time of the detected portion.

In some embodiments, the act of identifying the third time-period following the second time-period where there is threshold consistent fingerprint data matching occurring for the third threshold duration can involve identifying the third time-period following the second time-period where there is threshold consistent fingerprint data matching occurring for a duration selected from a range of 30 to 240 seconds.

In some embodiments, the non-local content-distribution system is or includes a cable-television head-end associated with a cable-television provider and the local content-distribution system is or includes a MVPD head-end.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations.

Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    detecting, by a computing system, over a particular time-period and at a periodic interval, match data indicating whether reference fingerprint data representing content transmitted by a non-local content-distribution system on a particular channel matches query fingerprint data representing content received by a content-presentation device on the particular channel;
    based on the detected match data, identifying, by the computing system, within the particular time-period:
    (i) a first time-period where there is threshold consistent fingerprint data matching occurring for a first threshold duration,
    (ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and
    (iii) a third time-period following the second time-period where there is threshold consistent fingerprint data matching occurring for a third threshold duration;
    based on the identified first, second, and third time-periods, detecting, by the computing system, that the local content-distribution system inserted local content into the content received on the particular channel in connection with the detected portion; and
    in response to the detected insertion, performing, by the computing system, an action.

2. The method of claim 1, wherein:
    performing the action comprises updating historical content consumption data associated with the content-presentation device to indicate that the content-presentation device remained tuned to the particular channel during the second time-period.

3. The method of claim 1, wherein:
    the method is performed for each of a plurality of content-presentation devices,
    the method further comprising:
    storing, in a non-transitory computer-readable storage medium, viewership data associated with the particular channel that indicates that each of the plurality of content-presentation devices remained tuned to the particular channel during the second time-period.

4. The method of claim 1, wherein:
    identifying the first time-period where there is threshold consistent fingerprint data matching occurring for the first threshold duration comprises identifying the first time-period where there is threshold consistent fingerprint data matching occurring for a duration selected from a range of 2 to 4 minutes.

5. The method of claim 1, wherein:
    identifying the second time-period where (a) there is the threshold consistent lack of matching for the second threshold duration, and (b) the second time-period corresponds to the detected portion of the content received by the content-presentation device that serves as the placeholder for local content to be inserted by the local content-distribution system comprises identifying the second time-period where (a) more than a threshold percentage of match attempts from the match data indicate a mismatch between the reference fingerprint data and the query fingerprint data for a duration selected from a range of 30-120 seconds, and (b) the second time-period has a start time and end time that are within a threshold time from a start time and an end time of the detected portion.

6. The method of claim 1, wherein:
    identifying the third time-period following the second time-period where there is threshold consistent fingerprint data matching occurring for the third threshold duration comprises identifying the third time-period following the second time-period where there is threshold consistent fingerprint data matching occurring for a duration selected from a range of 30 to 240 seconds.

7. The method of claim 1, wherein:
    the non-local content-distribution system comprises a cable-television head-end associated with a cable-television provider, and
    the local content-distribution system comprises a multi-channel video program distributor (MVPD) head-end.

8. A non-transitory computer-readable storage medium, having stored thereon program instructions that, upon execution by a processor, cause performance of a set of operations comprising:
    detecting, over a particular time-period and at a periodic interval, match data indicating whether reference fingerprint data representing content transmitted by a non-local content-distribution system on a particular channel matches query fingerprint data representing content received by a content-presentation device on the particular channel;
    based on the detected match data, identifying, within the particular time-period:
    (i) a first time-period where there is threshold consistent fingerprint data matching occurring for a first threshold duration,
    (ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and
    (iii) a third time-period following the second time-period where there is threshold consistent fingerprint data matching occurring for a third threshold duration;
    based on the identified first, second, and third time-periods, identifying that the local content-distribution system inserted local content into the content received on the particular channel in connection with the detected portion; and
    performing an action based on the detected insertion.

9. The non-transitory computer-readable storage medium of claim 8, wherein:

performing the action comprises updating historical content consumption data associated with the content-presentation device to indicate that the content-presentation device remained tuned to the particular channel during the second time-period.

10. The non-transitory computer-readable storage medium of claim 8, wherein:
the set of operations is performed for each of a plurality of content-presentation devices,
the set of operations further comprising:
storing viewership data associated with the particular channel that indicates that each of the plurality of content-presentation devices remained tuned to the particular channel during the second time-period.

11. The non-transitory computer-readable storage medium of claim 8, wherein:
identifying the first time-period where there is threshold consistent fingerprint data matching occurring for the first threshold duration comprises identifying the first time-period where there is threshold consistent fingerprint data matching occurring for a duration selected from a range of 2 to 4 minutes.

12. The non-transitory computer-readable storage medium of claim 8, wherein:
identifying the second time-period where (a) there is the threshold consistent lack of matching for the second threshold duration, and (b) the second time-period corresponds to the detected portion of the content received by the content-presentation device that serves as the placeholder for local content to be inserted by the local content-distribution system comprises identifying the second time-period where (a) more than a threshold percentage of match attempts from the match data indicate a mismatch between the reference fingerprint data and the query fingerprint data for a duration selected from a range of 30-120 seconds, and (b) the second time-period has a start time and end time that are within a threshold time from a start time and an end time of the detected portion.

13. The non-transitory computer-readable storage medium of claim 8, wherein:
identifying the third time-period following the second time-period where there is threshold consistent fingerprint data matching occurring for the third threshold duration comprises identifying the third time-period following the second time-period where there is threshold consistent fingerprint data matching occurring for a duration selected from a range of 30 to 240 seconds.

14. The non-transitory computer-readable storage medium of claim 8, wherein:
the non-local content-distribution system comprises a cable-television head-end associated with a cable-television provider, and
the local content-distribution system comprises a multichannel video program distributor (MVPD) head-end.

15. A computing system comprising:
a processor; and
a non-transitory computer-readable storage medium, having stored thereon program instructions that, upon execution by the processor, cause performance of a set of operations comprising:
detecting, over a particular time-period and at a periodic interval, match data indicating whether reference fingerprint data representing content transmitted by a non-local content-distribution system on a particular channel matches query fingerprint data representing content received by a content-presentation device on the particular channel;
based on the detected match data, identifying, within the particular time-period:
(i) a first time-period where there is threshold consistent fingerprint data matching occurring for a first threshold duration,
(ii) a second time-period following the first time-period where (a) there is a threshold consistent lack of matching for a second threshold duration, and (b) the second time-period corresponds to a detected portion of the content received by the content-presentation device that serves as a placeholder for local content to be inserted by a local content-distribution system, and
(iii) a third time-period following the second time-period where there is threshold consistent fingerprint data matching occurring for a third threshold duration;
based on the identified first, second, and third time-periods, detecting that the local content-distribution system inserted local content into the content received on the particular channel in connection with the detected portion; and
performing an action based on the detected insertion.

16. The computing system of claim 15, wherein:
performing the action comprises updating historical content consumption data associated with the content-presentation device to indicate that the content-presentation device remained tuned to the particular channel during the second time-period.

17. The computing system of claim 15, wherein:
identifying the first time-period where there is threshold consistent fingerprint data matching occurring for the first threshold duration comprises identifying the first time-period where there is threshold consistent fingerprint data matching occurring for a duration selected from a range of 2 to 4 minutes.

18. The computing system of claim 15, wherein:
identifying the second time-period where (a) there is the threshold consistent lack of matching for the second threshold duration, and (b) the second time-period corresponds to the detected portion of the content received by the content-presentation device that serves as the placeholder for local content to be inserted by the local content-distribution system comprises identifying the second time-period where (a) more than a threshold percentage of match attempts from the match data indicate a mismatch between the reference fingerprint data and the query fingerprint data for a duration selected from a range of 30-120 seconds, and (b) the second time-period has a start time and end time that are within a threshold time from a start time and an end time of the detected portion.

19. The computing system of claim 15, wherein:
identifying the third time-period following the second time-period where there is threshold consistent fingerprint data matching occurring for the third threshold duration comprises identifying the third time-period following the second time-period where there is threshold consistent fingerprint data matching occurring for a duration selected from a range of 30 to 240 seconds.

20. The computing system of claim 15, wherein:
the non-local content-distribution system comprises a cable-television head-end associated with a cable-television provider, and the local content-distribution system comprises a multi-channel video program distributor (MVPD) head-end.

\* \* \* \* \*